United States Patent [19]
Tanoue

[11] Patent Number: 6,148,281
[45] Date of Patent: Nov. 14, 2000

[54] DETECTING AND REPLACING BAD SPEECH SUBFRAMES WHEREIN THE OUTPUT LEVEL OF THE REPLACED SUBFRAME IS REDUCED TO A PREDETERMINED NON-ZERO LEVEL

[75] Inventor: Katsumi Tanoue, Tokyo, Japan

[73] Assignee: NEC Corporation, Tokyo, Japan

[21] Appl. No.: 08/862,311

[22] Filed: May 23, 1997

[30] Foreign Application Priority Data

May 23, 1996  [JP]  Japan ..................................... 8-128745

[51] Int. Cl.$^7$ .............................. G10L 3/00; H04B 17/00
[52] U.S. Cl. ...................... 704/201; 704/226; 455/226.1; 714/712
[58] Field of Search .................................... 704/222, 226, 704/228; 371/30, 37.02, 65; 455/226.1, 226.2; 370/472, 473, 474

[56] References Cited

U.S. PATENT DOCUMENTS

| 4,542,514 | 9/1985 | Watanabe | 455/305 |
| 4,815,134 | 3/1989 | Picone et al. | 704/222 |
| 4,979,188 | 12/1990 | Kotzin et al. | 704/222 |
| 5,012,518 | 4/1991 | Liu et al. | 704/222 |
| 5,073,940 | 12/1991 | Zinser et al. | 704/226 |
| 5,255,343 | 10/1993 | Su | 704/242 |
| 5,471,671 | 11/1995 | Wang et al. | 455/226.2 |
| 5,495,555 | 2/1996 | Swaminathan | 704/223 |
| 5,497,383 | 3/1996 | Thome et al. | 371/43 |
| 5,557,639 | 9/1996 | Heikkila et al. | 455/226.1 |
| 5,572,622 | 11/1996 | Wigren et al. | 704/228 |
| 5,598,431 | 1/1997 | Lobel | 455/226.1 |
| 5,630,210 | 5/1997 | Marry et al. | 455/226.3 |
| 5,732,356 | 3/1998 | Bolt | 704/228 |
| 5,751,767 | 5/1998 | Tatsumi | 455/226.2 |
| 5,784,406 | 7/1998 | DeJaco et al. | 375/224 |
| 5,839,061 | 11/1998 | Hendrickson et al. | 455/226.1 |

FOREIGN PATENT DOCUMENTS 4-263528  9/1992  Japan .

OTHER PUBLICATIONS

Rappaport, Wireless Communications, Principles and Practice. Prentice Hall.513–519, 1996.

*Primary Examiner*—Edward R. Cosimano
*Assistant Examiner*—M. David Sofocleous
*Attorney, Agent, or Firm*—Foley & Lardnder

[57] ABSTRACT

A receiving device comprises a demodulating section for demodulating transmission signal into a demodulated signal having a digital speech signal and a error detecting code. The demodulating section divides the digital speech signal into first through N-th subframe speech signals and detects a received field intensities of the first through the N-th subframe speech signals to produce first through N-th field detection signals representative of the received field intensities of the first through the N-th subframe speech signals, respectively, where N represents a positive integer which is greater than one. An error detecting section detects whether or not the digital speech signals has an error in accordance with the error detecting code to produce an n-th error detection signal when the digital speech signal has an error and when an n-th field detection signal has a received field intensity that is not greater than a predetermined received field intensity, where n is a variable between one and N, both inclusive. An interpolating section carries out interpolation of the digital speech signal in response to the n-th error detection signal to produce a speech signal.

1 Claim, 5 Drawing Sheets

DETECTING AND REPLACING BAD SPEECH SUBFRAMES WHEREIN THE OUTPUT LEVEL OF THE REPLACED SUBFRAME IS REDUCED TO A PREDETERMINED NON-ZERO LEVEL

BACKGROUND OF THE INVENTION

This invention relates to a receiving device used in a mobile radio communication system such as a personal handy-phone system.

It is known that a mobile radio communication system such as a personal handy-phone system (PHS) comprises a base station and a plurality of mobile stations each of which communicates with the base station. Inasmuch as the base station is connected to each of the mobile stations by a radio channel in the radio communication system, the transmission signal on the radio channel may be inevitably subjected to fading. As a result, error may occur in the transmission signal by fading. In order to detect the error in the transmission signal at a reception side, the transmission signal may carry an error detecting code.

It will be assumed that a base station transmits the transmission signal to a specific one of the mobile stations by the radio channel in a conventional personal handy-phone system. The transmission signal comprises a plurality of signal frames each of which may have a speech signal and an error detecting code. The specific mobile station comprises a receiving device for receiving the transmission signal as a reception signal. The receiving device demodulates the reception signal into a demodulated signal to detects an error at each of signal frames in accordance with the error detecting code. When the error exists in a particular one of the signal frames, the receiving device produces a muting signal which may be outputted from a loudspeaker. When the error does not exist in the particular signal frame, the receiving device outputs the speech signal from a loudspeaker.

As readily understood from the above description, the muting signal is outputted from the loudspeaker in each of the mobile stations when the error exists in the particular signal frame. Therefore, it is difficult to stably receive the speech signal in the receiving device used in each mobile station of the conventional personal handy-phone system.

SUMMARY OF THE INVENTION

It is therefore an object of this invention to provide a receiving device capable of receiving a transmission signal to produce a speech signal with a high stability in a radio communication system such as a personal handy-phone system.

Other objects of this invention will become clear as the description proceeds.

On describing the gist of this invention, it is possible to understand that a receiving device is for receiving a transmission signal carrying a digital speech signal and an error detecting code to produce a speech signal.

According to an aspect of this invention, the receiving device comprises first means (A) for demodulating the transmission signal into a demodulated signal having the digital speech signal and the error detecting code, the first means dividing the digital speech signal into first through N-th subframe speech signals, where N represents a positive integer which is greater than one, second means (B) supplied with the error detecting code and the first through said N-th subframe speech signals for detecting whether or not an n-th one of the first through the N-th subframe speech signals has an error in accordance with the error detecting code to produce an n-th error detection signal when the n-th subframe speech signal has the error, where n is variable between one and N, both inclusive, and third means (C) supplied with the digital speech signal for carrying out interpolation of the digital speech signal in response to the n-th error detection signal to produce the speech signal.

According to another aspect of this invention, the receiving device comprises first means (A) for demodulating the transmission signal into a demodulated signal having the digital speech signal and the error detecting code, the first means dividing the digital speech signal into first through N-th subframe speech signals, where N represents a positive integer which is greater than one, the first means detects a received field intensities of the first through the N-th subframe speech signals to produce first through N-th field detection signals representative of the received field intensities of the first through the N-th subframe speech signals, respectively, second means (B) supplied with the error detecting code, the first through said N-th subframe speech signals, and the first through the N-th field detection signals for detecting whether or not the digital speech signal has an error in accordance with the error detecting code to produce an n-th error detection signal when the digital speech signal has the error and when an n-th field detection signal has a received field intensity which is not greater than a predetermined received field intensity, where n is variable between one and N, both inclusive, and third means (C) supplied with the digital speech signal for carrying out interpolation of the digital speech signal in response to the n-th error detection signal to produce said speech signal.

DESCRIPTION OF THE PREFERRED EMBODIMENT

Figure 1:
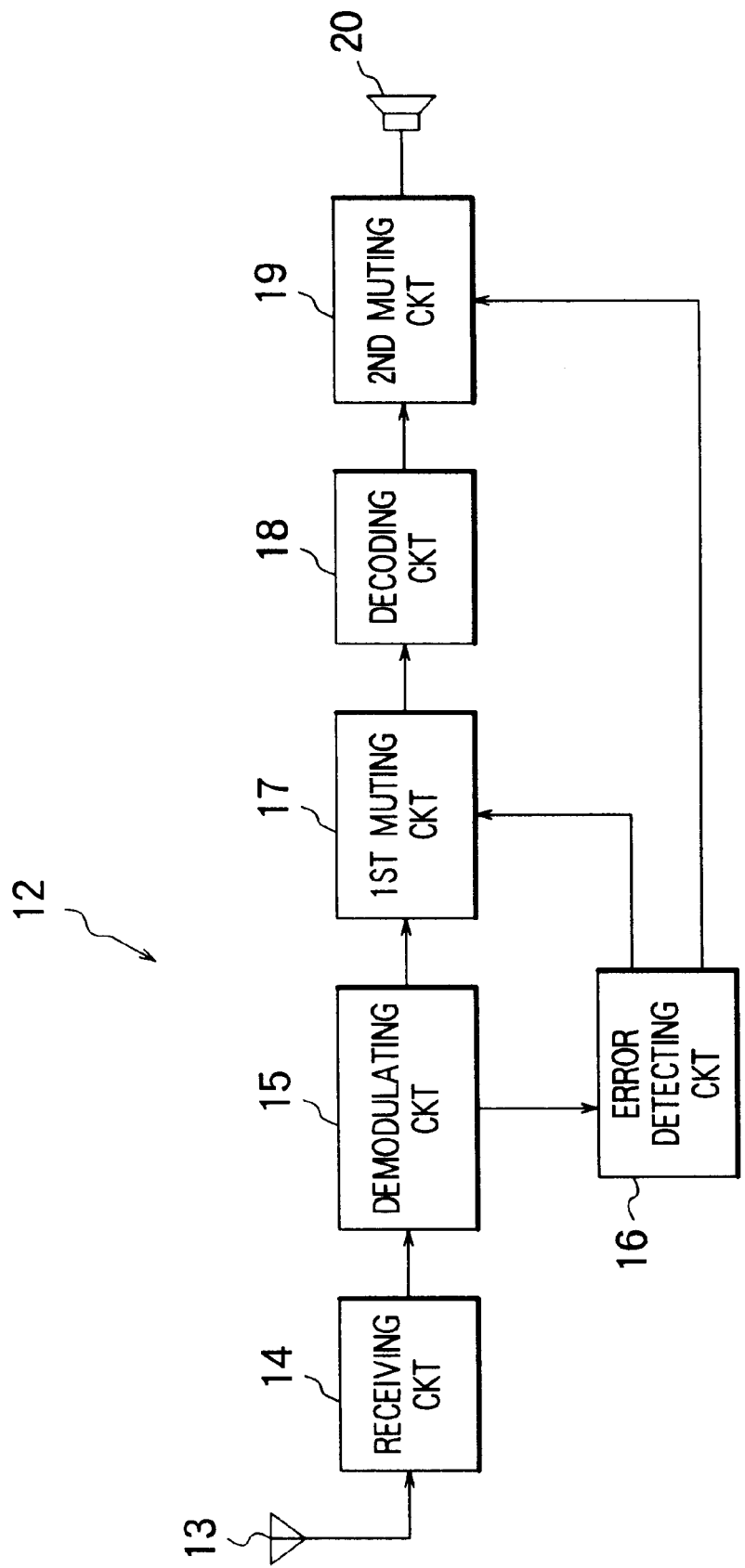
FIG. 1 is a block diagram of a conventional receiving device.

Referring to FIG. 1, a conventional receiving device will be described at first in order to facilitate an understanding of this invention. The illustrated receiving device is used in the radio communication system such as a personal handy-phone system (PHS). The personal handy-phone system comprises a PHS base station (not shown) and a plurality of PHS telephone devices, although only one PHS telephone device is illustrated in FIG. 1. The PHS base station may be connected to a public telephone network (not shown). The PHS base station communicates with the PHS telephone device by a radio channel as known in the art.

The PHS telephone device comprises a transmission section and a reception section 12 although only the reception section 12 is illustrated in FIG. 1. The transmission section is for transmitting a transmission signal to the PHS base station. The reception section 12 may be called the receiving device 12. The reception section 12 comprises an antenna 13, a receiving circuit 14, a demodulating circuit 15, an error detecting circuit 16, a first muting circuit 17, a decoding circuit 18, a second muting circuit 19, and a loudspeaker 20, all of which will be described later.

It will be assumed that PHS base station receives a digital speech signal from the public telephone network and that the digital speech signal is to be transmitted to the PHS telephone device. As known in the art, the digital speech signal may be produced on the basis of adaptive differential pulse code modulation (ADPCM). Therefore, the digital speech signal may be called an ADPCM signal. The PHS base station produces a transmission signal carrying the digital speech signal.

Figure 2:
FIG. 2 shows a view for illustrating a signal frame of a transmission signal which is transmitted to the receiving device illustrated in FIG. 1.

Referring to FIG. 2, the transmission signal comprises a plurality of signal frames each of which has a lump bit part (R) 21, a start symbol part (SS) 22, a preamble part (PR) 23, an unique word part (UW) 24, an information part (I) 25, an error detecting code part (CRC) 26, and a guard part (G) 27. The lump bit part 21 carries a lump bit for use in absorbing the variation of transient response of a leading edge of a burst. The start symbol part 22 carries a start symbol which indicates a start point of the burst. The preamble part 23 carries a preamble for use in bit synchronization. The unique word part 24 carries an unique word for use in frame synchronization. The information part 25 carries the digital speech signal. The error detecting code part 26 carries an error detecting code. The guard part 27 carries a guard bit for use in absorbing the variation of transient response of the leading edge of the burst.

Again referring to FIG. 1, the reception section 12 of the PHS telephone device receives the transmission signal as a reception signal at the antenna 13. The reception signal is delivered to the receiving circuit 14, which converts the reception signal into a baseband signal. The baseband signal is supplied to the demodulating circuit 15. The demodulating circuit 15 demodulates the baseband signal into a demodulated signal having reception frames each of which is similar to the signal frame illustrated in FIG. 2.

The demodulating circuit 15 extracts the digital speech signal and error detecting code from the demodulated signal. The demodulating circuit 15 supplies the digital speech signal to the first muting circuit 17. Furthermore, the demodulating circuit 15 supplies the digital speech signal and the error detecting code to the error detecting circuit 16.

The error detecting circuit 16 carries out an error detection in accordance with the error detecting code at each reception frame to produce an error detection result. More particularly, the error detecting circuit 16 judges whether or not an error occurs in each of reception frames in accordance with the error detecting code. When an error occurs in a particular one of the reception frames, the error detecting circuit 16 produces an error detection signal as the error detection result. When an error does not occur in the particular reception frame, the error detecting circuit 16 produces a non-error detection signal as the error detection result. Each of the error and the non-error detection signals is delivered to the first and the second muting circuits 17 and 19.

Responsive to the error detection signal, the first muting circuit 17 carries out a muting operation to produce a first muting signal that is supplied to the decoding circuit 18. The decoding circuit 18 decodes the first muting signal into an analog muting signal which is supplied to the second muting circuit 19. The second muting circuit 19 carries out a muting operation in response to the error detection signal to supply a second muting signal to the loudspeaker 20.

On the other hand, the first muting circuit 17 stops the muting operation in response to the non-error detection circuit. The first muting circuit 17 allows the digital speech signal to pass therethrough. The decoding circuit decodes the digital speech signal into an analog speech signal. The second muting circuit 19 stops the muting operation in response to the non-error detection signal. The second muting circuit 19 allows the analog speech signal to pass therethrough. The loudspeaker 20 outputs speech on the basis of the analog speech signal.

As described above, the second muting signal is outputted from the loudspeaker in the PHS telephone device 11 when an error occurs in the particular reception frame. More particularly, the PHS telephone device becomes set to a muting state when an error occurs in the particular reception frame. When the PHS telephone device becomes set to the muting state, a user has an unnatural sense inasmuch as the speech drops. Therefore, it is difficult to produce the speech signal in the reception section 12 with a high stability.

Figure 3:
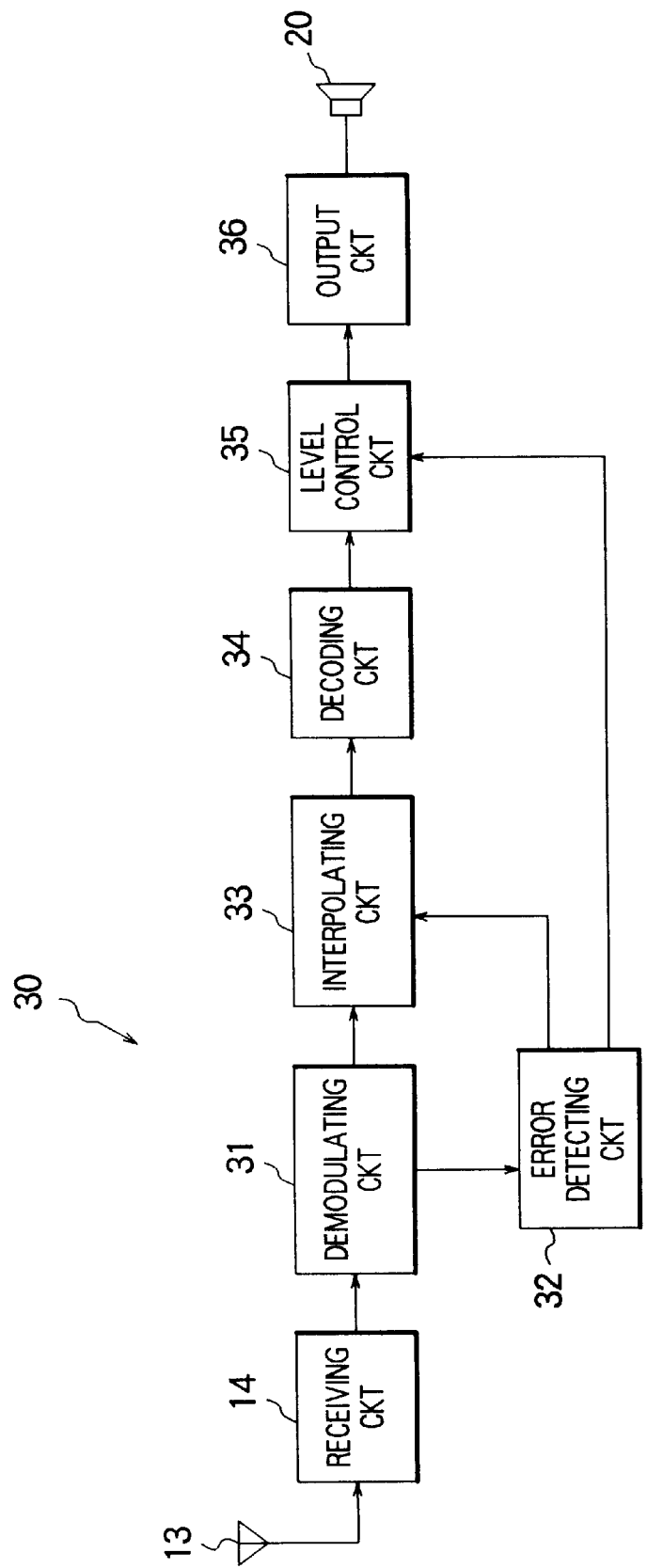
FIG. 3 is a block diagram of a receiving device according to an embodiment of this invention.

Referring to FIG. 3, description will proceed to a receiving device according to a preferred embodiment of this invention. In the example being illustrated, the receiving device is used as a reception section of a PHS telephone device of the personal handy-phone system (PHS). The PHS telephone device further comprises a transmission section (not shown) which transmits a transmission signal to a PHS base station (not shown).

The receiving device is different in structure from the receiving section 12 illustrated in FIG. 1 and is therefore designated afresh by a reference numeral 30. The receiving device comprises similar parts which are designated by like reference numerals and operable with likewise named signals.

The receiving device 30 further comprises a demodulating circuit 31, an error detecting circuit 32, an interpolating circuit 33, a decoding circuit 34, a level control circuit 35, and an output circuit 36, all of which will be described later. As described in conjunction with FIG. 1, the receiving device 30 receives, as the reception signal, the transmission signal which is transmitted from the PHS base station and which has a signal frame illustrated in FIG. 2. More particularly, the receiving device 30 receives the transmission signal as the reception signal at the antenna 13. The reception signal is delivered to the receiving circuit 14 which converts the reception signal into a baseband signal.

Supplied with the baseband signal, the demodulating circuit 31 demodulates the baseband signal into a demodulated signal having the signal frame illustrated in FIG. 2. The demodulating circuit 31 extracts the digital speech signal and the error detecting code from the demodulated signal to supply the digital speech signal to the interpolating circuit 33. The demodulating circuit 31 divides the digital speech signal into first through N-th digital subframe signals on first through N-th subframes each of which has a predetermined length, where N represents a positive integer which is greater than one. The demodulating circuit 31 supplies the error detecting circuit 32 with the first through the N-th digital subframe signals and the error detecting code.

In accordance with the first through the N-th digital subframe signals and the error detecting code, the error detecting circuit 32 detects whether or not an error exists in an n-th subframe to produce an n-th error detection signal when an error exists in the n-th subframe where n is a variable between 1 and N, both inclusive. The n-th error detection signal is supplied to the interpolating circuit 33 and the level control circuit 35.

Responsive to the n-th error detection signal, the interpolating circuit 33 carries out interpolation of the digital speech signal to produce an interpolated digital speech signal that is supplied to the decoding circuit 34. More particularly, the interpolating circuit 33 replaces the n-th digital subframe signal with a (n-1)-th digital subframe signal to produce an interpolated digital speech signal. The decoding circuit 34 decodes the interpolated digital signal into a decoded speech signal that is delivered to the level control circuit 35.

Responsive to the n-th error detection signal, the level control circuit 35 controls or adjusts the level of the decoded speech signal to an adjusted speech signal having a predetermined level. More specifically, the decoded speech signal has first through N-th decoded subframe signals. The level control circuit 35 makes the level of an n-th decoded subframe signal be reduced to a predetermined level to produce the adjusted speech signal. The adjusted speech signal is supplied to the output circuit 36 to be converted into an analog speech signal. By the output circuit 36, the analog speech signal may be amplified into an amplified speech signal that is supplied to loudspeaker 20 to be outputted as speech from the loudspeaker 20.

As described above, the receiving device 30 divides the signal frame into the first through the N-th subframes to detect whether or not an error occurs in each of the first through the N-th subframes. The receiving device 30 carries out interpolation of the digital speech signal in accordance with an error detection. In other words, it is possible to produce the speech signal in the receiving device 30 with high stability inasmuch as the receiving device 30 does not carry out a muting operation.

Figure 4:
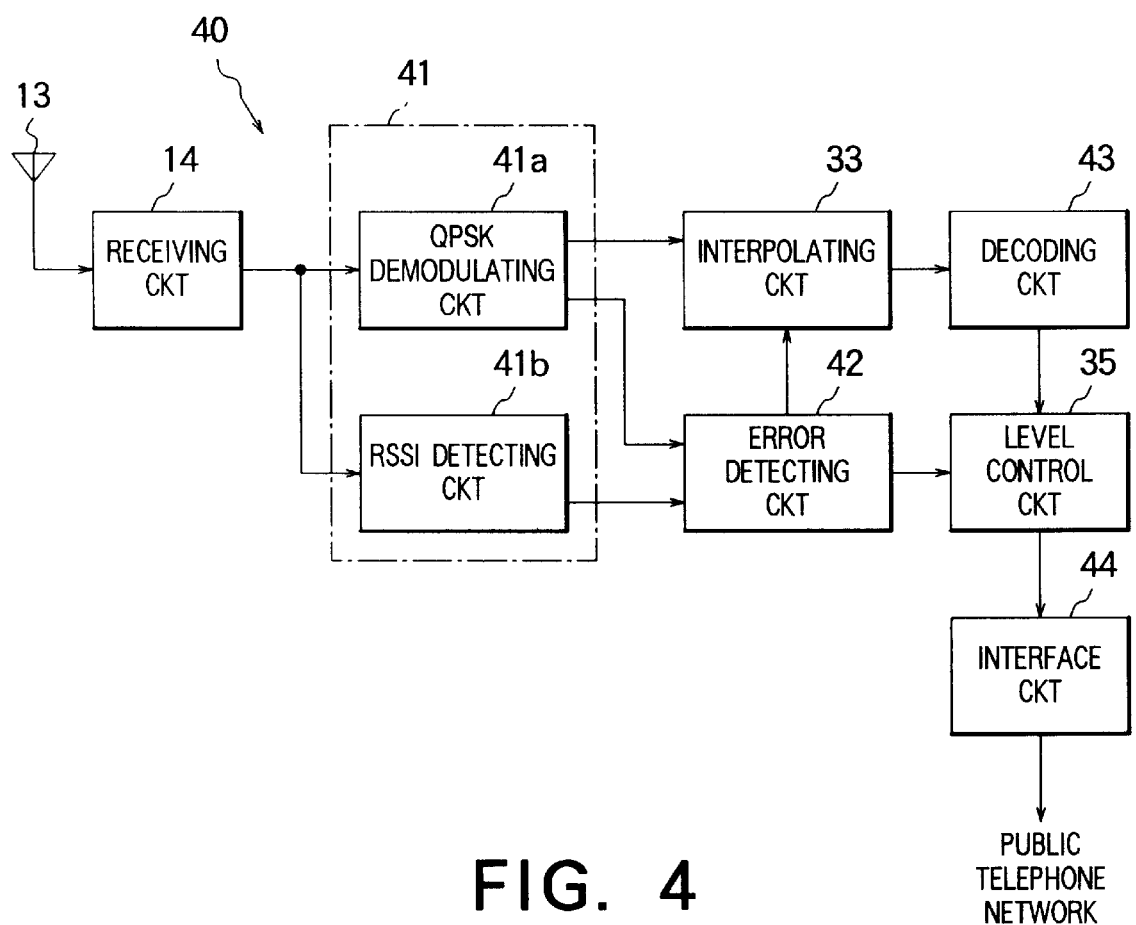
FIG. 4 is a block diagram of a receiving device according to another embodiment of this invention.

Referring to FIG. 4, description will proceed to a receiving device 40 for use in a PHS base station of the personal handy-phone system. The receiving device is used as a base reception section in the PHS base station. The PHS base station further comprises a base transmission section for transmitting a base transmission signal to the PHS telephone device.

The receiving device 40 is different in structure from the receiving device 30 illustrated in FIG. 3. The receiving device 40 comprises similar parts that are designated by like reference numerals and operable with likewise named signals.

The receiving device 40 further comprises a demodulating section 41, an error detecting circuit 42, a decoding circuit 43, and an interface circuit 44. In the example being illustrated, the receiving device 40 receives a mobile transmission signal from the PHS telephone device (not shown). The mobile transmission signal may be produced on the basis of quadrature phase shift keying (QPSK). The PHS telephone device converts an input analog speech signal into a mobile digital speech signal of 32 kbps on the basis of adaptive differential pulse code modulation (ADPCM). The PHS telephone device modulates the mobile digital signal into the mobile transmission signal on the basis of the QPSK. The mobile transmission signal has a signal frame similar to the signal frame illustrated in FIG. 2.

The receiving device 40 receives the mobile transmission signal as a base reception signal at the antenna 13. The base reception signal is delivered to the receiving circuit 14 to be converted into a baseband signal.

The demodulating section 41 comprises a QPSK demodulating circuit 41a and a received signal strength indicator (received field intensity: RSSI) detecting circuit 41b. Supplied with the baseband signal, the QPSK demodulating circuit 41a demodulates the baseband signal into a demodulated signal which is an ADPCM signal of 32 kbps. The demodulated signal has the signal frame illustrated in FIG. 2. More particularly, the demodulated signal has the signal frame comprising 240 bits. The QPSK demodulating circuit 41a extracts the digital speech signal and the error detecting code. The digital speech signal is supplied from the QPSK demodulating circuit 41a to each of the error detecting circuit 42 and the interpolating circuit 33. The error detecting code is supplied from the QPSK demodulating circuit 41a to the error detecting circuit 42.

The baseband signal is further supplied to the RSSI detecting circuit 41b. The RSSI detecting circuit 41b obtains the digital speech signal from the baseband signal to divide the digital speech signal into first through the N-th digital subframe signals on first through the N-th subframes each of which has a predetermined length. More specifically, the RSSI detecting circuit 41b produces first through N-th subframe speech signals on the first through the N-th subframes each of which has the length of 4 bits. The RSSI detecting circuit 41b detects a RSSI of each of the first through N-th subframe speech signals to produce first through the N-th RSSI detection signal. The first through the N-th RSSI detection signal is supplied to the error detecting circuit 42.

The error detecting circuit 42 detects whether or not an error occurs in the digital speech signal in accordance with the error detecting code. When an error occurs in the digital speech signal, the error detecting circuit 42 detects whether or not an n-th one of the first through the N-th RSSI detection signals has a RSSI level which is not greater than a prescribed level, where n is a variable between 1 and N, both inclusive. When the error occurs in the digital speech signal and when the n-th RSSI detection signal has a RSSI level which is not greater than the prescribed level, the error detecting circuit 42 produces an n-th error detection signal representative of an n-th subframe having an error. When an error does not occur in the digital speech signal, the error detecting circuit 42 does not produce the n-th error detection signal. Responsive to the n-th error detection signal, the interpolating circuit 33 carries out interpolation of digital speech signal to produce an interpolated digital speech signal which is supplied to the decoding circuit 43. In a case where the interpolating circuit 33 is not supplied with the error detection signal, the interpolating circuit 33 does not carry out interpolation of the digital speech signal.

Figure 5A:
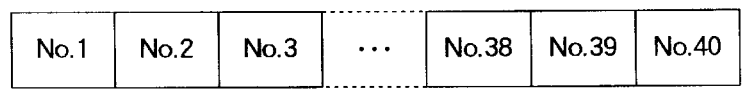
FIGS. 5A through 5D show a view for describing an interpolating operation of the receiving device illustrated in FIG. 4.
Figure 5B:
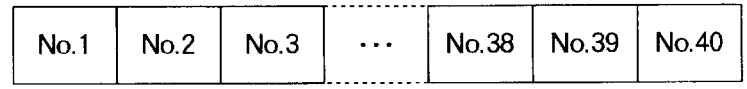

Referring to FIGS. 5A through 5D in addition to FIG. 4, it will be assumed that the digital speech signal has first through fortieth subframe speech signals No.1 to No. 40 illustrated in FIG. 5A. In FIG. 5A, the digital speech signal does not have an error. Namely, each of the first through the fortieth subframe speech signals does not have an error. In this case, the interpolating circuit 33 does not carry out interpolation of the digital speech signal inasmuch as the interpolating circuit 33 is not supplied with the n-th error detection signal. The interpolating circuit 33 outputs the digital speech signal as an output digital signal illustrated in FIG. 5B.

Figure 5C:
Figure 5D:
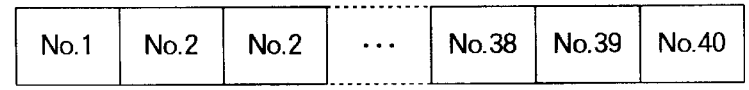

It will be assumed that the third subframe speech signal has an error as shown by oblique lines in FIG. 5C. When the third subframe speech signal has the error, the error detecting circuit 42 supplies the interpolating circuit 33 with the third error detection signal representative of an error in the third subframe as described above. Responsive to the third error detection signal, the interpolating circuit 33 carries out interpolation of the speech signal to produce the interpolated digital speech signal. More particularly, the interpolating circuit 33 replaces the third subframe speech signal with the second subframe speech signal to produce the interpolated digital speech signal as the output digital speech signal illustrated in FIG. 5D.

The output digital speech signal is supplied to the decoding circuit 43. The decoding circuit 43 decodes the output digital speech signal into a decoded speech signal. More specifically, the decoding circuit 43 decodes the output digital speech signal into a PCM speech signal of 64 kbps.

The decoded speech signal is supplied to the level control circuit 35. The level control circuit 35 is further supplied with the n-th error detection signal when the error detecting circuit 42 produces the n-th error detection signal. Responsive to the n-th error detection signal, the level control circuit 35 controls or adjusts the level of the decoded speech signal to produce the adjusted speech signal.

More specifically, it will be assumed that the decoded speech signal has first through fortieth decoded subframe signals. When the third subframe speech signal has the error as shown in FIG. 5C, the error detecting circuit 42 supplies the level control circuit 35 with the third error detection signal representative of an error in the third subframe. The level control circuit 35 makes the level of the third decoded subframe signal be reduced to the predetermined level in response to the third error detection signal. The adjusted speech signal is supplied to the interface circuit 44 to be delivered to the public telephone network which may be, for example, an integrated services digital network (ISDN).

While this invention has thus far been described in conjunction with the preferred embodiment thereof, it will readily be possible for those skilled in the art to put this invention into practice in various other manners.

What is claimed is:

1. A receiving device for receiving a transmission signal carrying a digital speech signal and an error detecting code provided for each of a plurality of signal frames to produce a speech signal, said receiving device comprising:

first means for demodulating, for each of said plurality of signal frames, said transmission signal into a demodulated signal having said digital speech signal and said error detecting code, said first means also dividing said digital speech signal into first through N-th subframe speech signals for first through N-th subframes that collectively make up each one of said plurality of frames, where N represents a positive integer which is greater than one;

second means supplied with said error detecting code and said first through said N-th subframe speech signals for detecting whether or not an n-th one of said first through said N-th subframe speech signals has an error in accordance with said error detecting code to produce an n-th error detection signal when said n-th subframe speech signal has the error, where n is variable between one and N, both inclusive; and third means supplied with said digital speech signal for carrying out interpolation of said digital speech signal in response to said n-th error detection signal to produce said speech signal, wherein said third means comprises:
fourth means for carrying out interpolation of said digital speech signal in response to said n-th error detection signal to produce an interpolated digital speech signal; and
fifth means for decoding said interpolated digital speech signal to produce said speech signal, wherein said fifth means comprises:
decoding means for decoding said interpolated digital speech signal into a decoded speech signal; and
level adjusting means for making a level of said decoded speech signal be reduced to a predetermined non-zero level in response to said n-th error detection signal to produce said speech signal.

* * * * *